Jan. 27, 1970      I. R. HIGGINS      3,492,092
ION EXCHANGE PROCESS FOR TREATING CRUDE MINERAL SOLUTIONS
Filed April 4, 1966      5 Sheets-Sheet 5
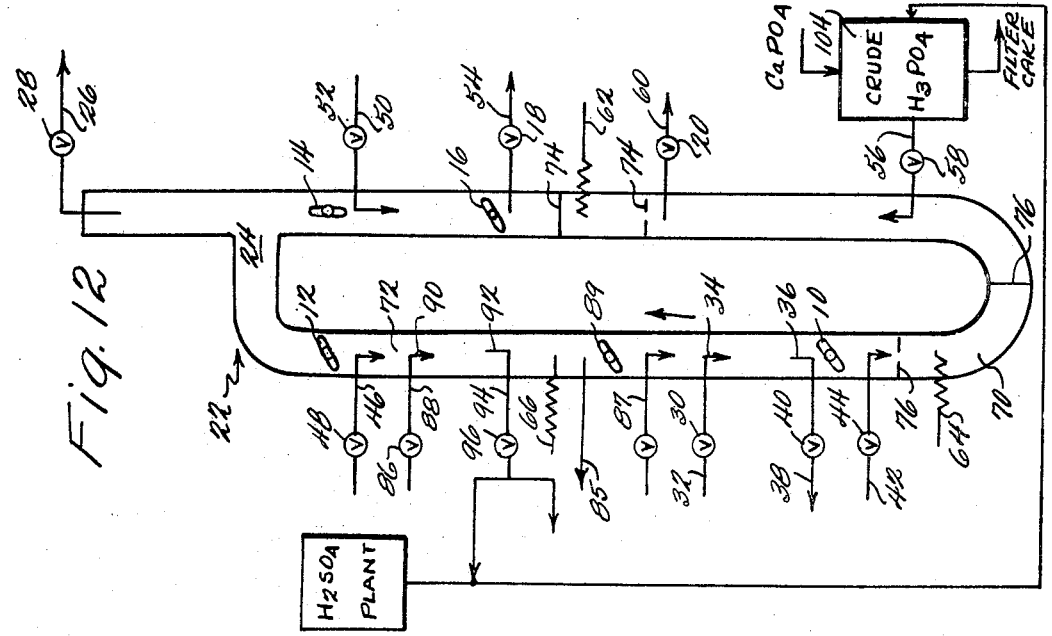
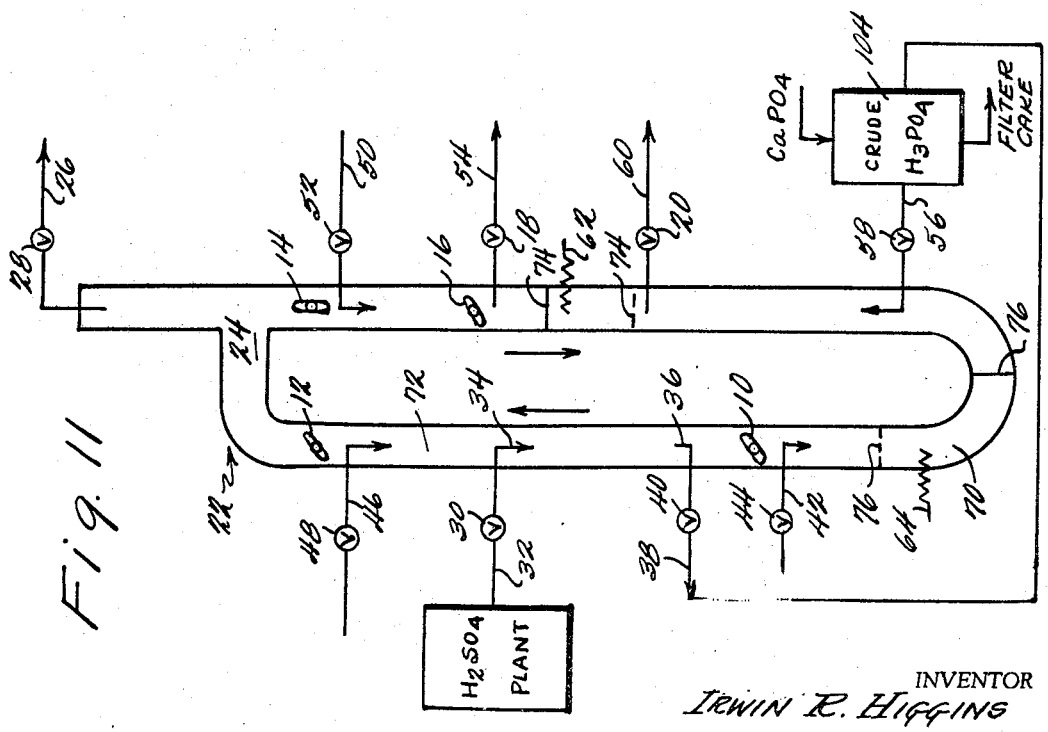
INVENTOR
IRWIN R. HIGGINS
BY
Cushman, Darby & Cushman
ATTORNEYS

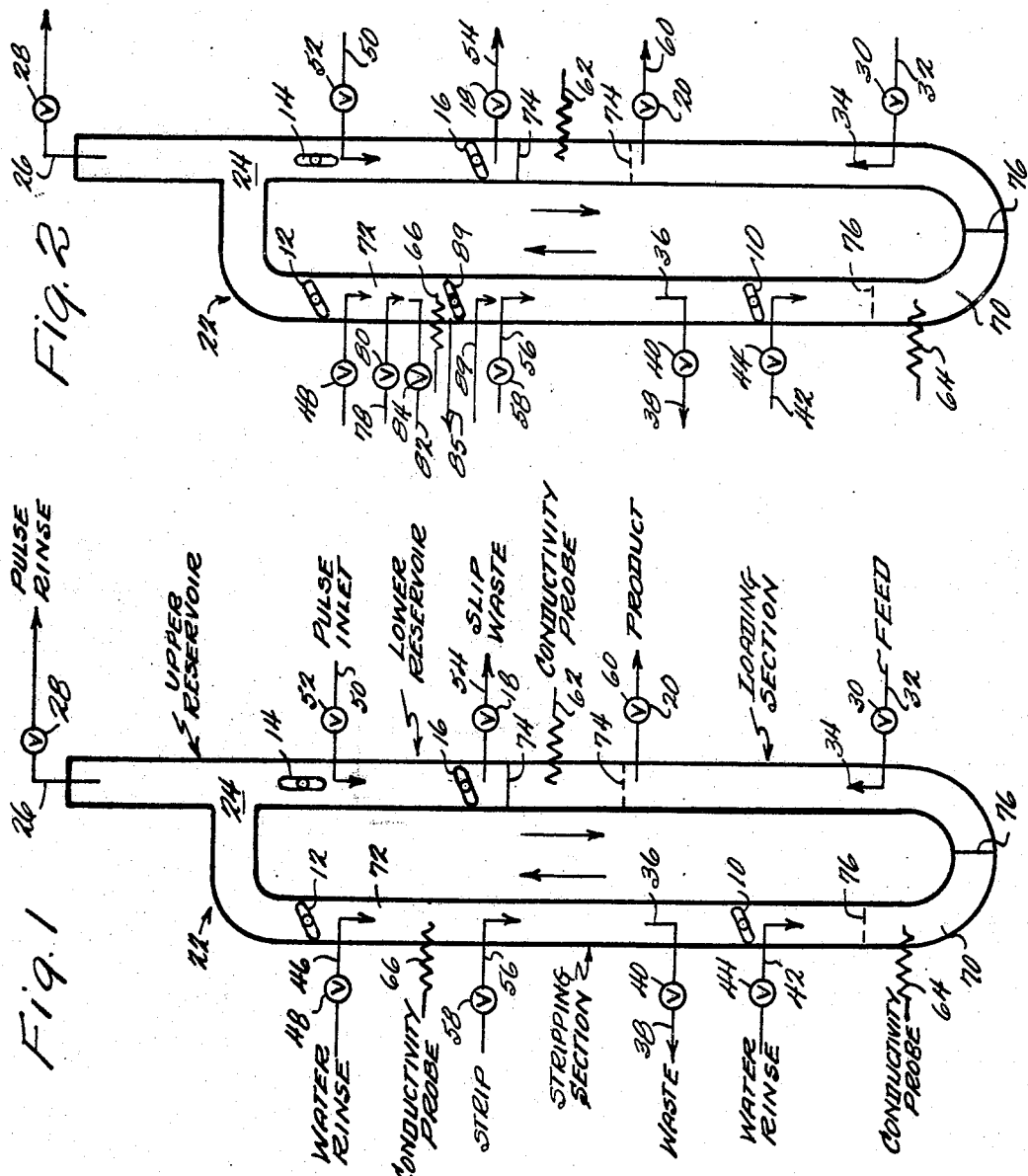

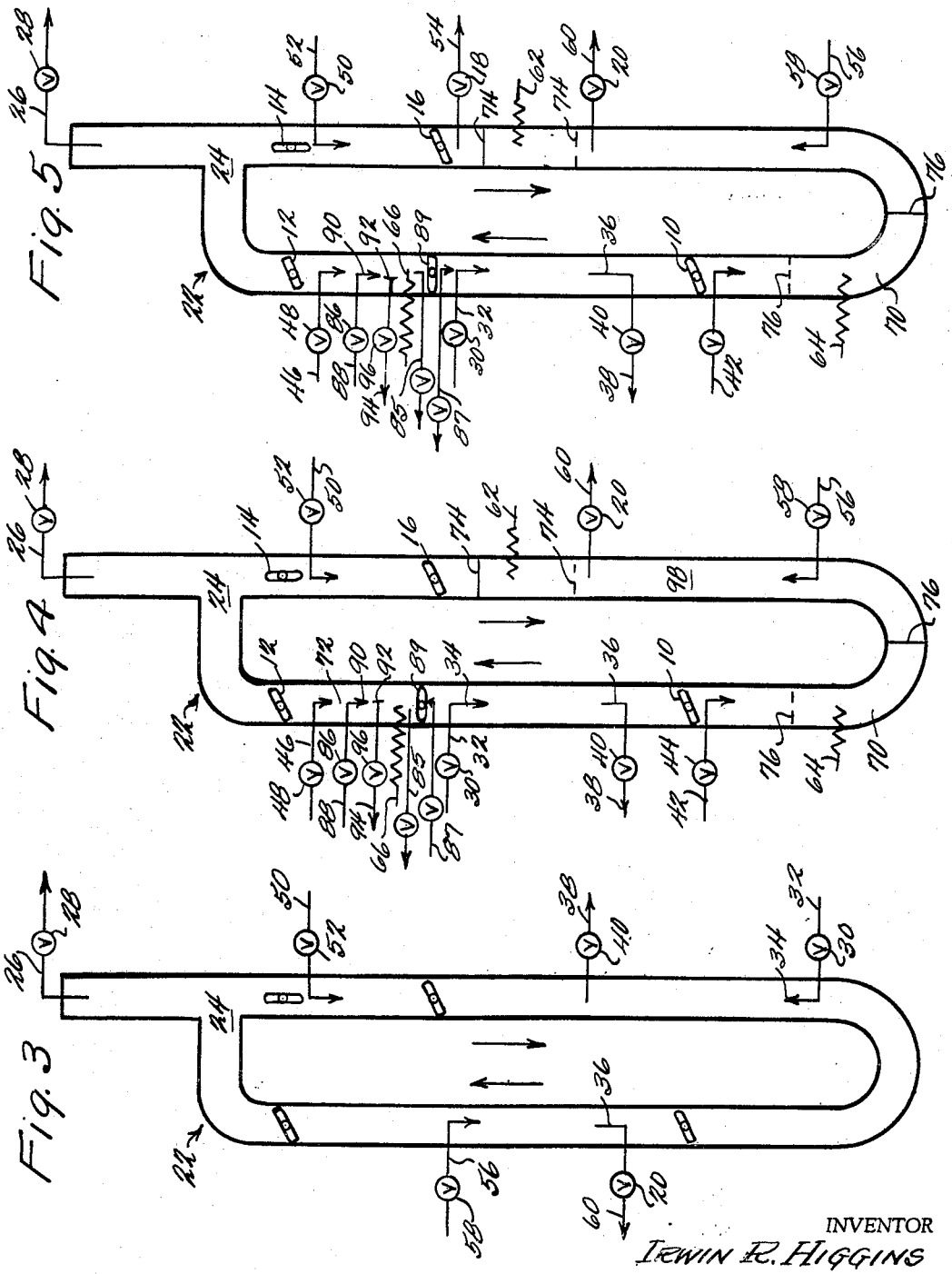

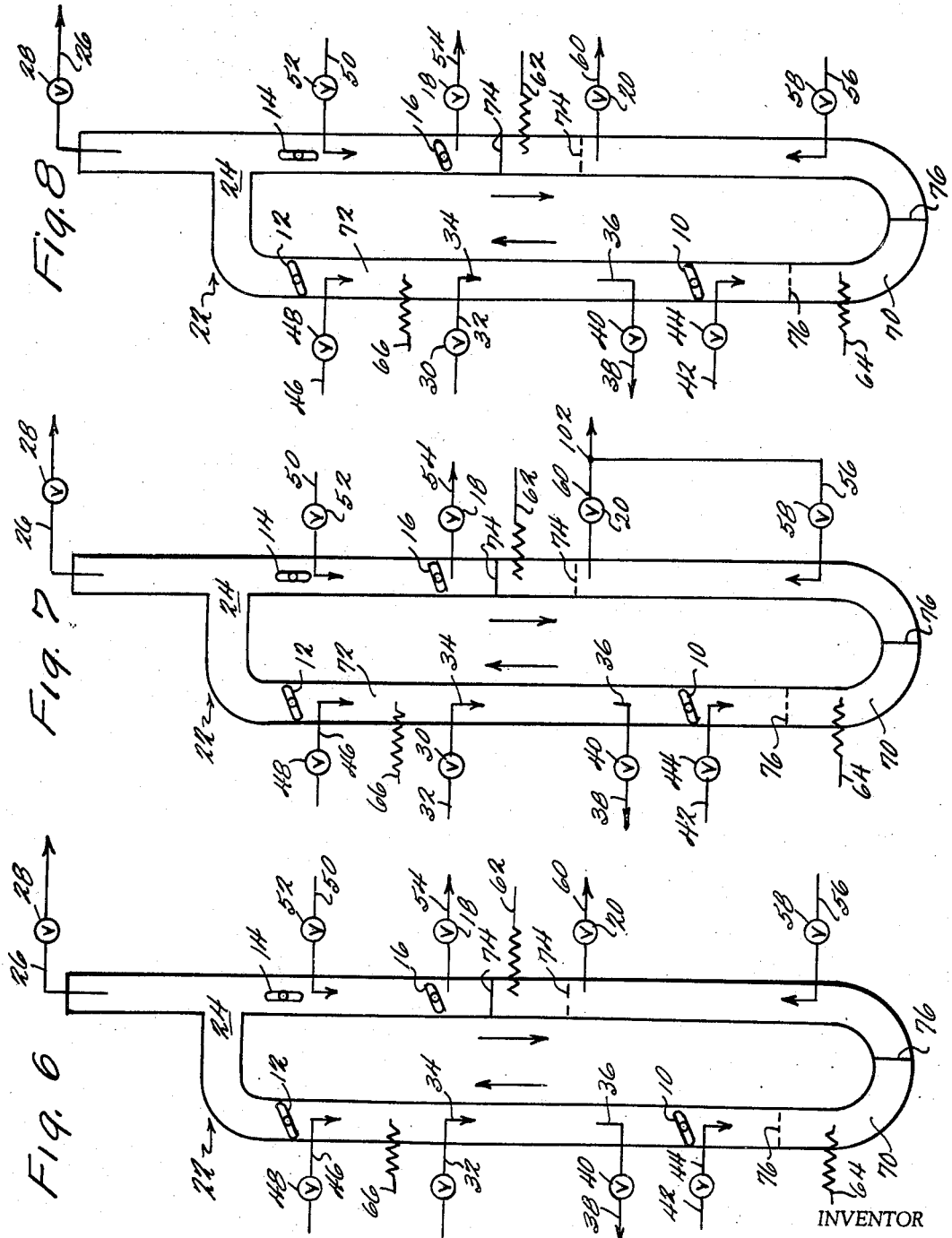

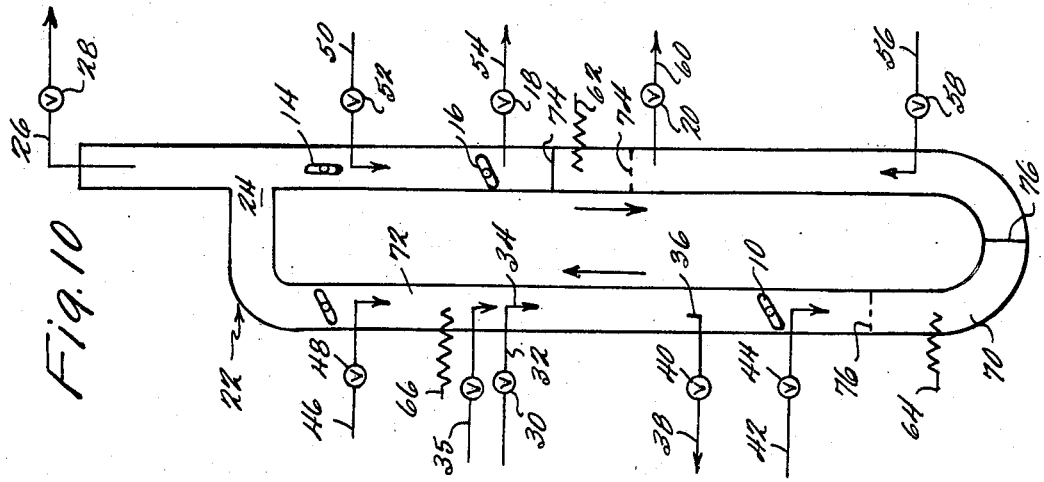
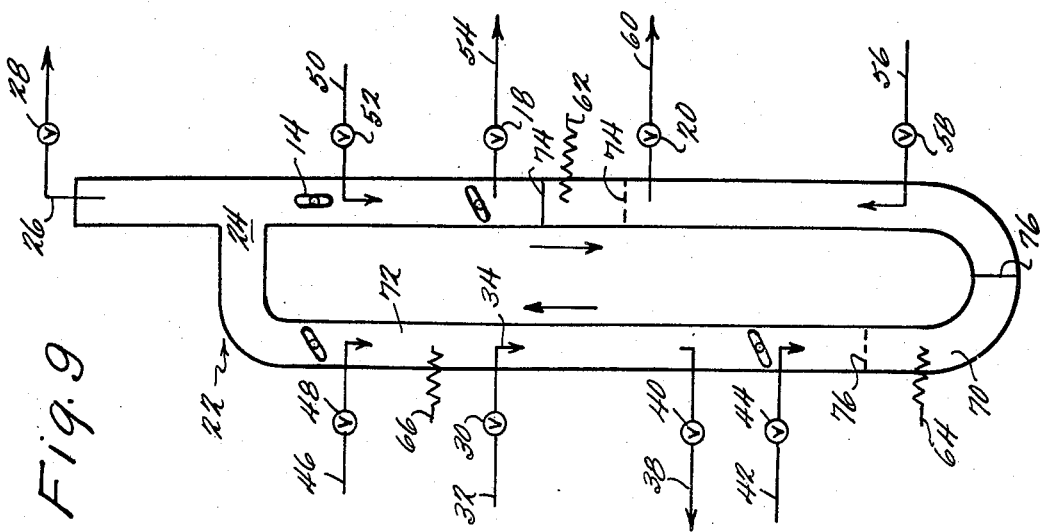

United States Patent Office 3,492,092
Patented Jan. 27, 1970

3,492,092
ION EXCHANGE PROCESS FOR TREATING CRUDE MINERAL SOLUTIONS
Irwin R. Higgins, Oak Ridge, Tenn., assignor to Chemical Separations Corporation, Oak Ridge, Tenn., a corporation of Tennessee
Filed Apr. 4, 1966, Ser. No. 539,928
Int. Cl. C01b 25/18
U.S. Cl. 23—165    13 Claims

ABSTRACT OF THE DISCLOSURE

A continuous process for treatment of a crude mineral solution consisting essentially of (1) flowing said crude mineral solution through a first section of an ion exchange column loop having a shiftable ion exchange resin bed therein, to bring the same into contact with a first portion of the ion exchange resin therein and exchanging ions from the mineral deposit solution for ions of the exchange resin, while (2) treating a second portion of said ion exchange resin loaded with ions eliminated from the mineral deposit solution from (1) with a stripping agent in a second section of said column loop; (3) exchanging the ions eliminated from the mineral deposit solution and deposited on the exchange resin for ions of the stripping agent and withdrawing purified mineral solution; (4) interrupting the flow of said crude mineral solution and said stripping agent; (5) shifting the ion exchange resin bed in said ion exchange column loop from one section thereof to another contiguous section therein, thereby replacing at least a portion of said resin in said first section with another portion of said resin previously stripped in said second section and displacing a portion of resin carrying the ions previously eliminated from the crude mineral solution into said second section for stripping thereof; (6) and repeating the same cycle of steps (1)–(5) as long as desired.

---

This invention relates to a process for the treatment of basic fertilizer and mineral materials in order to put them into a form more suitable for use as fertilizer feeds, detergents and general chemical purposes.

It is well known that fertilizer or plant food compositions require adequate amounts of the basic elements potassium, phosphorous and nitrogen plus lesser amounts of sulfur, carbon, boron, etc. Additionally, these compositions must be substantially free from undesirable element components such as chlorine and excessive amounts of sodium which can adversely affect plant growth, color and can have other detrimental effects. It is also a commercially important requirement that the materials be prepared in bulk form with a desirably high concentration of potassium, phosphorus and nitrogen. This means that significant or substantial amounts of extraneous chemicals and elements should not be present since their inclusion adds considerably to the weight of the product, thus causing significant outlays for transportation costs.

A primary source of phosphate is phosphate rock which is, principally, calcium phosphate. However, the phosphorus content of this and other naturally occurring phosphate minerals is not in a form that is readily available to growing plants nor is it in a form suitable for the use in detergents. Accordingly, these minerals must be treated to convert the phosphorus to a more suitable form. Generally, this is accomplished by acidulation, i.e. the dissolution of the rock with sulfuric acid. Thus, sulfuric acid and phosphate rock are the raw materials for the production of normal superphosphate and wet process phosphoric acid. The phosphoric acid resulting from these conventional processes often is used to make triple superphosphate and ammonium phosphate. The general reaction in making normal superphosphate can be expressed as follows:

The general reaction in producing wet process phosphoric acid can be expressed, generally, as:

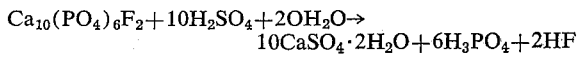

The calcium sulfate resulting from the above processes forms crystalline gypsum which forms a precipitate and which can be filtered from reaction mass. Generally, the $P_2O_5$ equivalent from the normal superphosphate process is about 20 percent while the $P_2O_5$ equivalent from a wet process phosphoric acid operation is approximately 30 percent. In either case the product is generally sent to evaporators where it is concentrated to a $P_2O_5$ equivalent of approximately 55 percent in order to more conveniently and economically ship it to other locations for commercial use.

Disadvantageously, in the production of such phosphates, especially in the wet process, a great many contaminants are included in the product. These contaminants include aluminum, iron, calcium, sodium, potassium, sulfates, fluorides and silica. It has been known that these contaminants form certain complexes and cause a great many problems in the production, use and transportation of the phosphate product. For instance, it is known that aluminum and iron in large amounts crystallize with the phosphate with loss of phosphate product and with cumbersome sludging problems. The presence of calcium also causes post precipitation and scaling of heat exchangers. It has been known that the presence of potassium causes a major portion of post precipitation, slowly forming a complex salt sludge which has a composition $(Fe,Al)_3KH_{14}(PO)_8 \cdot 4H_2O$. The presence of sulfates in the phosphate product made according to conventional processes causes undesirable corrosion and when it combines with calcium it forms scale and post precipitation. An excessive amount of silica in the product also causes undesirable scaling as well as clouding of the liquid product.

In addition to the desirability of treating naturally occurring phosphates to provide a commercially useful and acceptable product, great interest is also evidenced in preparing naturally occurring potassium deposits to produce acceptable fertilizers and detergent materials. Naturally occurring potassium sources in the United States are found in New Mexico and consist chiefly of muriate of potash (KCl). Similar deposits are also found in Canada. The chloride component of this salt is quite detrimental to plants, particularly tobacco and potatoes. Further, the presence of chloride adds considerably to the weight of the product and therefore undesirably increases freight costs. Yet other potassium-containing deposits are in the form of naturally occurring sub-soil brines which can be extracted by wells. Unfortunately, these deposits have typically high concentrations of less valuable sodium, magnesium, and calcium as well as chlorides. Various methods have been proposed in the past for extracting the potassium values from these brines. However, these methods have generally been cumbersome and expensive, requiring substantial expenditures for apparatus, costly heat consuming evaporators and crystallizers. Further, the yields of desirable product have been uneconomically low.

Certain methods involving ion exchange principles have, heretofore, been proposed to overcome the disadvantages experienced in treating the above-described basic materials and deposits but such methods have not been commercially acceptable since they involve fixed ion exchange resin beds which cannot easily attain high production rate requirements and which either involve dilution and/or losses of the product resulting from tailings. It has further been found that in the use of ion exchange principles problems of removing contaminants have arisen due to complexing of certain of the contaminating metals. Thus, it has been found that fluorine complexes with silica and aluminum as well as aluminum and iron with phosphates. The presence of fluorine in the desired product can have certain disadvantages depending on the end use of the product while in situations where a purified phosphoric acid is desired, the complexing of the phosphate ion with certain metals undesirably reduces the ultimate yield of the acid. Thus, the attempts to separate the desired components from the undesirable components, suspensions and impurities have proved uneconomic. As a result, there remains undeveloped today many uses for crude phosphoric acid and many potassium-rich natural deposits because there is no commercially feasible process for their treatment.

The objects of this invention include providing a novel and practical method for the extraction and preparation of fertilizer and detergent materials from basic materials, naturally occurring mineral deposits and particularly those relatively rich in phosphorus and potassium values. It is part of the objects to provide a process utilizing ion exchange principles with a moving ion exchange resin bed for the treatment of such basic materials and to prepare fertilizer and detergent compositions which may be easily recovered.

A further part of the objects of this invention is to provide a process in which phosphorus and potassium values of basic materials are obtained as relatively concentrated aqueous solutions.

Still further aspects of the objects of this invention will be apparent from the following description thereof and in reference to the attached drawings.

In the drawings:

FIGURE 1 schematically illustrates the ion exchange resin column loop employed in the following embodiments of the invention:

(1) a system for producing purified $H_3PO_4$ from an untreated crude $H_3PO_4$ feed and $H_2SO_4$ using a strong acid cation resin;

(2) a system for producing purified $H_3PO_4$ from an untreated crude $H_3PO_4$ feed and HCl using a strong acid cation resin;

(3) a system for producing purified $H_3PO_4$ from a dilute, untreated crude $H_3PO_4$ feed and $H_2SO_4$ using a strong acid cation resin;

(4) a system for producing purified $H_3PO_4$ from a dilute, untreated crude $H_3PO_4$ feed and HCl using a strong acid cation resin;

(5) a system for producing purified $H_3PO_4$ from an untreated crude $H_3PO_4$ feed and $H_2SO_4$ present in 100 to 150 percent excess of stoichiometric amount required using a strong acid cation resin with a pretreatment of the crude $H_3PO_4$ feed to reduce the iron contaminant to the ferrous state;

(6) the system shown in (5) above wherein the crude $H_3PO_4$ feed is preliminarily treated to remove silica and fluoride;

(7) a system for producing purified $H_3PO_4$ from an untreated crude $H_3PO_4$ feed and HCl present in 50 percent excess of stoichiometric amount required using a strong acid cation resin with a pretreatment of the crude $H_3PO_4$ feed to reduce the iron contaminant to the ferrous state;

(8) the system shown in (7) above wherein the crude $H_3PO_4$ feed is preliminarily treated to remove silica and fluoride;

FIGURE 2 schematically illustrates a system for producing purified $H_3PO_4$ and an alkali metal sulfate from an untreated crude $H_3PO_4$ feed, $H_2SO_4$ and an alkali metal chloride using a strong acid cation resin;

FIGURE 3 schematically illustrates the ion exchange resin column loop employed in the following ion exclusion processes:

(1a) an ion exclusion process for producing purified $H_3PO_4$ from an untreated crude $H_3PO_4$ feed and water using a strong acid cation resin;

(2a) the system shown in (1a) above, wherein the crude $H_3PO_4$ feed is preliminarily treated to reduce the iron contaminant to the ferrous state;

(3a) the system shown in (2a) above, wherein the crude $H_3PO_4$ feed is preliminarily treated to remove silica and fluoride;

FIGURES 4 and 5 schematically illustrate systems for producing detergent grade phosphate from a purified $H_3PO_4$ feed, an alkali metal chloride, and a base using a weak base anion exchange resin;

FIGURE 6 schematically illustrates a system for producing $K_2SO_4$ from $CaSO_4$ and $KCl$ using a strong acid cation exchange resin;

FIGURE 7 schematically illustrates a system for producing $K_2CO_3$ from $H_2CO_3$ and $KCl$ using a strong base anion resin;

FIGURE 8 schematically illustrates a system for producing a more efficient HCl stripping agent from a naturally occurring brine solution such as KCl or NaCl and $H_2SO_4$ by using a strong acid cation resin;

FIGURE 9 schematically illustrates a system for producing $KNO_3$ from $HNO_3$ and KCl using a strong acid cation resin;

FIGURE 10 schematically illustrates a system according to this invention to separate sodium and potassium ions from a mixed brine solution containing several base metals using a strong acid cation resin;

FIGURE 11 schematically illustrates yet another system for producing purified $H_3PO_4$ using 5 to 10 percent excess $H_2SO_4$ and crude $H_3PO_4$; and FIGURE 12 schematically illustrates yet another system for producing purified $H_3PO_4$ using 15–20 percent excess $H_2SO_4$, NaCl and $H_3PO_4$.

General description of apparatus and method

As stated, this invention utilizes an ion exchange system. Specifically involved is the concept of an intermittently continuous counter-current flow of resin and solution. This concept is realized in the use of an ion exchanger which consists of a packed bed of resin contained in a closed loop made up of reacting sections which are separated by valves built into the loop. The resin is moved around the loop in one direction while solutions are brought into the loop through distributors having a mesh opening of a size smaller than the resin beads. The solutions flow countercurrent to the flow of the resin for a predetermined length during which ion exchange or exclusion takes place. The reaction products are removed from the ion exchange column through another set of distributors.

The counterflow of resin and solution is accomplished by alternately (1) pulsing an incremental amount of resin while the solution flows are stopped and then (2) locking the resins in their respective sections while the solution flows are resumed counter-current to the previous flow of resin.

Stepwise a typical cycle employing a column described above is as follows and is described with reference to FIGURE 1.

(a) The valves 10, 12, 14 and 16 are positioned, as shown, for the solution pumping period, which may last for two or three minutes. The valves isolate the various sections within the column and the resin bed is stationary. The solutions are flowing through the sections.

(b) Immeriately prior to movement of the resin bed, which can last for about ten seconds, valve 14 which is intermediate the upper and lower reservoirs is closed and valves 10, 12, 16 are opened. The solution flows are discontinued. A hydraulic pulse is applied which shifts the whole resin bed a few inches.

(c) When the pulsing phase is completed, valve 14 is opened again while valves 10, 12 and 16 are closed. This locks the resin in its respective reacting sections wherein it is again contacted by solutions. Valve 14 is opened to permit displaced resin to drop into the lower reservoir and ultimately into the loading section for another cycle.

The rinse and "slip" waste sections are provided to maintain a relatively high concentration in the product. During resin movement, the solutions move faster and farther than the resin, usually two or three times. This movement is called slippage. As a result, the interfaces between the various solutions move around the loop into sections other than those in which they were located prior to such movement. It becomes necessary to return the interfaces to their original position. This is accomplished in the rinse sections where a countercurrent rinse makes a void volume displacement of the solution. The entire rinsing operation is controlled by conductivity probes which stop the rinsing action when the interface crosses a probe built into the section.

Further, during the resin movement or pulsing phase, rinse medium and resin are moved into the loading and stripping sections. To avoid mixing rinse medium with the product, a conductivity probe senses the interface and allows this slippage volume to be eliminated separately before drawing off undiluted product. This is accomplished in the column by opening valve 18 in the slip waste line and keeping valve 20 in the product line closed until the interface moves past the product line and is sensed by the conductivity probe positioned between the product line and the slip waste line. Thereafter valve 18 is closed and valve 20 is opened to remove an undiluted, relatively concentrated product.

General description of specific embodiments of the invention

The instant invention advantageously has been found to be suitable for preparing fertilizer materials and detergent chemicals from a number of different feeds and stripping agents. These various embodiments will be described in greater detail below but, for the present, they will briefly be set forth to emphasize the wide scope and applicability of the present invention.

In one embodiment, a crude, untreated $H_3PO_4$ feed can be contacted with a strong acid cation resin in the column shown in FIGURE 1 to provide a purified $H_3PO_4$ product relatively free from sludge producing contaminants, such as calcium, potassium, sodium, iron and aluminum. In this embodiment 60 percent of the potassium and sodium contaminants and greater than 75 percent of the calcium value present in the original crude feed are eliminated while up to about 10 percent of the aluminum and iron contaminants are removed. The system employs, as a stripping agent, $H_2SO_4$ in amounts of about 400 percent in excess of the stoichiometric amount required for exchanging the metal ions, i.e. sodium, potassium, calcium, aluminum and iron absorbed on the strong acid cation resin in the loading section of the column. Less than a 10 percent dilution of the resulting purified $H_3PO_4$ product results. In addition, substantially all of the sulfates, fluorides, and silica present in the original feed are withdrawn from the column with the purified $H_3PO_4$ product. Advantageously, a production rate of 14 tons per day per square foot can be achieved with less than 1 percent loss of $P_2O_5$.

As an alternative to the embodiment described above, HCl can be used as the stripping agent and in this instance it will generally be present in amounts of about 50 percent in excess of the stoichiometric amount required for exchanging the metal ion, i.e. sodium, potassium, calcium, aluminum and iron absorbed on the strong acid cation resin. In this alternative embodiment, less than a 5 percent dilution of the resulting purified $H_3PO_4$ product results while the amount of sodium, potassium and calcium removal is increased to about 90 percent of their content in the original crude feed. Comparable advantageous production rates are also achieved in this alternative embodiment.

Certain advantages exist in using HCl rather than $H_2SO_4$ as the stripping agent although depending on the circumstances $H_2SO_4$ because of its relatively inexpensive cost often will be used. It has been found, for instance, that in producing purified phosphoric acid containing calcium as a contaminant, precipitation of $CaSO_4$ in the column can occur if measures are not taken to reduce or inhibit this reaction. Controlling the concentration of $H_2SO_4$ as well as the temperature of the solutions within the column assist in reducing undesirable side effects when using $H_2SO_4$. Further, HCl is more highly ionized than is $H_2SO_4$ and thus its potential availability for resin exchange is somewhat greater than $H_2SO_4$. However, as stated before, $H_2SO_4$ is less expensive than HCl and it is often more readily available to commercial phosphate producers.

In yet two other embodiments of the invention, the crude $H_3PO_4$ feed can be diluted with water 5 to 10 times and when $H_2SO_4$ or HCl is used as the stripping agent, approximately 90 percent of the contaminating material, such as sodium, potassium, calcium, aluminum, and iron are removed. When HCl is used with a dilute feed the amount used is generally only 10 percent in excess of the stoichiometric amount required for exchanging the acid phosphate ion from the resin. On the other hand, when $H_2SO_4$ is employed, it is present usually in about 300 percent excess of the stoichiometric amount. Ordinarily, the product is diluted less than about 5 percent when HCl is used as the stripping agent and less than about 10 percent when the stripping agent is $H_2SO_4$.

As yet another embodiment of the invention, an alkali metal sulfate, such as sodium sulfate or potassium sulfate can be produced in the production of a purified $H_3PO_4$ product by introducing a brine solution comprising sodium chloride or potassium chloride into the column while using sulfuric acid as a stripping agent. In this embodiment the concentration of the sulfuric acid is about 150 percent in excess of the stoichiometric amount of the alkali metal chloride introduced into the system. Generally, less than about a 5 percent dilution of the purified $H_3PO_4$ product occurs with a production rate and loss of $P_2O_5$ content comparable to those mentioned before.

When the amount of sulfuric acid stripping agent is reduced to 100 to 150 percent in excess of the stoichiometric amount employed, according to yet another embodiment of the invention, the sodium and potassium contaminants are eliminated in amounts of 60 percent of their original content. Further, 75 percent of the calcium and iron contaminants in the original feed are removed while up to about 10 percent of the aluminum contaminant is eliminated. As modifications of this general process, the fluoride and the silica contaminant can be eliminated from the crude feed by a treatment with a sodium salt such as $Na_2CO_3$, NaCl or the like to precipitate preliminarily $Na_2SiF_6$. As another embodiment of the invention the feed is pretreated with a reducing agent such as elemental iron, $SO_2$ or the like to reduce the iron content to the ferrous state which facilitates its removal from the system and in this situation where HCl is used as a stripping agent, nearly 90 percent of the sodium, potassium, calcium, and iron contaminants are removed with up to about 10 percent elimination of the aluminum contaminants. As a modification of this embodiment, the feed is additionally pretreated to remove silica and fluoride.

As stated above, the instant invention is also advantageously employed in the treatment of natural brine solutions to produce relatively concentrated HCl by using $H_2SO_4$ as a stripping agent. Generally, the concentration of $H_2SO_4$ will be about 25 percent in excess of the stoichiometric amount required to exchange the alkali metal from the resin. The exact amount of $H_2SO_4$ can vary and will depend in part on the crystallization point of the alkali metal sulfate removed from the system.

Ion exclusion techniques are also advantageously accomplished according to the methods of the instant invention. Thus, a crude $H_3PO_4$ feed can be introduced into the apparatus employed with this invention where it is absorbed as $H_3PO_4$ molecule on the resin. Thereafter, water is introduced into the system and a relatively concontrated purified $H_3PO_4$ product is recovered. The product additionally includes a ferric ion and an aluminum fluoride complex. This embodiment is advantageous in that it provides for nearly 80 percent removal of sodium, potassium, and calcium with approximately 20 percent removal of iron and up to about 10 percent elimination of the iron contaminant. Approximately 80 percent of the sulfate present in the original crude feed is also removed by this process as waste. Conveniently, nearly 7 tons of product per day per sq. ft. can be recovered according to this embodiment of the invention.

As embodiments of the ion exclusion techniques the crude feed can be pretreated to remove silica and fluorine contaminants by precipitation therefrom with a sodium salt such as sodium carbonate to produce $Na_2SiF_6$. This embodiment provides for removal of nearly 70 percent of the fluorine and silica and when a second pretreatment operation is conducted by passing this solution over a reducing agent, such as elemental iron or contacting it with other conventional reducing agents such as $SO_2$, iron removal is increased to 80 percent and nearly 70 percent of the original aluminum content is removed. As yet another modification of the instant invention, the purified $H_3PO_4$ product resulting from one of the aforementioned embodiments can be treated with a KCl to produce a liquid type detergent chemical $K_2HPO_4$. In this embodiment the product is recovered as a 4 N solution at a rate of about 7 tons per day per sq. ft. Approximately, 90 percent of the sulfate which was present in the purified $H_3PO_4$ feed is removed in this method.

Accordingly, an alternative embodiment to produce a solid detergent grade composition, namely, $Na_2HPO_4$, can be produced by feeding a similar purified $H_3PO_4$ feed and sodium chloride to the column. Again approximately 90 percent of the sulfate contaminant present in the relatively pure $H_3PO_4$ feed is removed.

In treating natural brine solutions containing, for instance, KCl, commercially acceptable fertilizers, such as $KNO_3$ can be produced when $HNO_3$ is used as a stripping agent. In this situation $HNO_3$ is present in amounts of about 15 percent in excess of the stoichiometric amount required to exchange the potassium ion from the loaded strong acid cation resin. The resulting $KNO_3$ product is recovered conveniently as a 4 N solution. Approximately 5 tons of product with less than 1 percent loss of potassium can be achieved.

The brine solution can also be treated to produce $K_2SO_4$ by using $CaSO_4$ as a stripping agent. The stripping agent is present generally in amounts of 100 percent in excess of the stoichiometric amount required to release the potassium ion from the loaded strong acid cation resin. The calcium sulfate which is in part removed in the product system can conveniently be filtered and recycled to the stripping agent inlet. Approximately 5 tons of product (1.5 N) per day per sq. ft. can be produced with less than 1 percent loss of potassium. In yet another modification of the basic invention, a brine solution comprising approximately 4 N potassium chloride solution can be treated with pressurized carbon dioxide to produce $K_2CO_3$. In this embodiment nearly 5 tons per day of the $K_2CO_3$ can be produced with less than about 1 percent loss of potassium. As a further embodiment, a solution containing potassium and sodium ions, for instance, a mixed brine solution can be treated to convert the potassium to an acceptable nitrate fertilizer by employing nitric acid as a stripping agent and potassium chloride as a scrubbing agent.

As yet a further embodiment of this invention, a purified $H_3PO_4$ product can be achieved in association with an existing $H_2SO_4$ production plant. Thus, when $H_2SO_4$ is introduced into the column in amounts exceeding the stoichiometric requirements for exchanging metal ion of a crude phosphate feed by about 5 to 10 percent, the waste $H_2SO_4$ can conveniently be cycled to a unit into which is introduced phosphate rock $[Ca_3(PO_4)_2]$. The resulting calcium sulfate is separated from the crude phosphoric acid which serves as a feed for the column loop. The $H_2SO_4$ consumption in the column is generally equal to the calcium content of the crude $H_3PO_4$ introduced therein.

As another embodiment of the instant invention to produce a purified $H_3PO_4$ product in association with an existing $H_2SO_4$ plant, $H_2SO_4$ and NaCl can be introduced into the column, the $H_2SO_4$ being employed in amounts of about 15 to 20 percent in excess of the stoichiometric amount required for exchanging the metal ion of crude phosphate feed. The waste aqueous solution of $H_2SO_4$ and $Na_2SO_4$ can be combined with commercially produced $H_2SO_4$ and cycled to a unit into which is introduced a crude source of phosphate. The sodium salt reacts with the silica and fluoride in this acidulation reaction, substantially removing them from the crude phosphoric acid which is separated from the resulting calcium sulfate. The crude phosphoric acid serves as a feed for the column loop.

Specific description of the invention

The following processes which are described in greater detail each utilize essentially the same apparatus and operational principles associated with FIGURE 1.

Referring to FIGURE 1, the column 22 comprises a "loop" adapted for the intermittent circulation of a strong acid cation resin from and to the loading section in the direction of the arrows. This column is constructed in accordance with the principles disclosed and claimed in U.S. Patent 2,815,332, issued Dec. 3, 1957, to the present inventor.

The continuous ion exchange column 22 includes the loading section which is arranged to allow upward flow of the resin and the stripping section, arranged for downward flow of resin. The column opens into a through orifice 24. The reservoir divided into an upper and lower section is provided with resin valves 14 and 16.

As shown, upper reservoir extends above the communicating orifice 24 and is provided with pipe 26 controlled by valve 28 to permit overflow of waste wash water and resin fines into a disposal or resin fines recovery unit (not shown).

In one embodiment of the instant invention during the loading operation, crude untreated $H_3PO_4$ is delivered to the column through valve 30 via pipe 32 and distributor 34. The crude $H_3PO_4$ flows upwardly through a strong acid cation exchange resin which completely fills the loading section. The contaminating cations, i.e., sodium, potassium, calcium, aluminum and iron, are exchanged for the hydrogen ion of the resin and essentially purified $H_3PO_4$ is removed from the column via product line 20 provided with valve 60.

The stripping section is provided with line 56 controlled by valve 58 for introducing stripping agent $H_2SO_4$ into this section. The flow of stripping agent is downward or countercurrent to the upwardly flowing ion exchange resin containing the contaminating ions. The contaminants, as mentioned above, are exchanged for the hydrogen ion of the stripping agent and are removed from the column as waste via collecting means 36 and pipe 38 provided with valve 40. Approximately 60 percent of the sodium and potassium together with about 75 percent of the calcium contaminants which were present in the crude $H_3PO_4$ feed were thus removed while slightly less than 10 percent of the aluminum and iron contaminants were eliminated.

The column is also provided with rinse line 42 controlled by valve 44 and adapted to deliver a rinse medium, generally water, from a source (not shown) into the column. As shown, a rinse line 42 is in communication with the column at a point below resin valve 10. A second rinse line 46, leading from a source (not shown) and controlled by valve 48 is arranged to be in communication with the column just below valve 12. The column is also provided with a pulsing medium line 50 controlled by valve 52 to introduce into the column a pulsing medium, generally water, from a source (not shown). Line 50 communicates with the column at a point slightly below valve 14. A slip waste outlet line 54 in communication with the column, is also provided and is controlled by valve 18 for removal of waste wash water at a point between valve 16 and the loading section. Intermediate the slip waste outlet line 54 and the purified $H_3PO_4$ outlet conduit 60 is conductivity probe 62.

As a further and important feature of this invention, means are provided for the substantially automatic control of the rinsing action, thus maintaining high concentration of the ultimate product without contamination. As an embodiment of these control means, there is provided a first conductivity probe 62 as described above, a second conductivity probe 64 positioned at a point below rinse line 42 and a third conductivity probe 66 arranged between the $H_2SO_4$ inlet 56 and rinse line 46. These conductivity probes are responsive to changes in the conductivity of the solution in the ion exchange resin column at their respective locations, and through appropriate servo mechanisms (not shown) actuate the respective line valve in response to such changes in conductivity measurements.

In operation during the loading and stripping cycles $H_2SO_4$ flows downwardly through the stripping section and a separate portion of the ion exchange resin is loaded with, essentially, the contaminating ions of the crude $H_3PO_4$ feed. During the cycle the resin bed is stationary, valves 10, 12 and 16 being closed while valve 14 is open. After a predetermined time of flow of $H_2SO_4$ through the stripping section, the flow of stripping agent and crude $H_3PO_4$ feed is discontinued and valves 10, 12 and 16 are opened while valve 14 is closed. A pulsing medium is admitted through pulse inlet 50 and a hydraulic thrust is applied to the resin bed in the top of the lower reservoir. The resin is thus pushed around the loop in the direction shown by the arrows.

During the pulsing cycle, water and resin are thus pushed into water elimination section 68, $H_3PO_4$ and contaminant loaded resins are pushed into stripping section rinse section 70, water is pushed into stripping section rinse section 70, $H_2SO_4$ is pushed into stripping section rinse section 72 and water and resin are pushed into the upper reservoir. The $H_3PO_4$ water interfaces 74 and 76 which existed before pulsing began at the position shown by the solid line are moved about the loop with the resin to the positions indicated by the broken lines.

Subsequently, the flow of pulsing medium to the column is discontinued while valves 10, 12 and 16 are closed. Valve 14 is again opened. The resin that had been pushed into the upper reservoir secton drops into the lower reservoir. The crude $H_3PO_4$ is admitted to the column and slip waste line is also open. As $H_3PO_4$ flows upwardly into the loading section the $H_3PO_4$ water interface travels upwardly into the water elimination section 68. Conductivity probe in this section senses the lower conductivity of water and prevents $H_3PO_4$ from being transferred out of the column through the product outlet line by maintaining valve 20 closed. When $H_3PO_4$ hits the conductivity probe 62 in section 68 this closes valve 18 stopping the outlet of slip waste. Valve 20 is open to allow purified $H_3PO_4$ to leave the column through the product line 60.

$H_3PO_4$ will also have surrounded the conductivity probe 64 in rinse section 70, which senses the increased conductivity and signals water to enter section 70 through line 42 by opening valve 44. Valve 44 is closed and the water flow ceases when the conductivity indicates that water is contacting the conductivity probe 64. In a similar manner, the solution in section 72 is rinsed out with water admitted through line 46 and conductivity probe 66 indicates when the water stripping solution interface has passed below it. This conductivity control of water flow in the column prevents dilution of the $H_3PO_4$ product.

Subsequently, the rinse medium entering through line 46 is discontinued and $H_2SO_4$ is again admitted to the stripping section while the contmainants are removed through line 38. After expiration of the established stripping period the resin movement is repeated through the steps just described.

As stated, an advantageous feature of this invention lies in the use of conductivity probes 62, 64 and 66 to detect the position of the various interfaces between different liquids in the column and to prevent dilution and loss of the stripping agent. Additionally, these probes prevent dilution of the feed and product. While there is a certain disturbance of ion exchange resin in the column during its intermediate movement from one place to another, it has been found that product/ and stripping agent/ water interfaces form a definite boundary between the solutions. Because of this phenomena, it has been possible to maintain safeguards to prevent adulteration of the product or stripping agent by inadvertent admixture thereof with water or the crude feed.

It will also be understood that it is a preferable feature of this invention to arrange automatic valve cycling in response to the basic time schedule and the sense response of the respective conductivity probe. Thus, conductivity probe 62 can be arranged with suitable solenoid valves 18 and 20 so that valve 20 will remain closed and valve 18 will remain open until the $H_3PO_4$ interface 74 is above probe 62. Should the interface fall below probe 62, valve 20 is automatically closed and valve 18 is automatically opened.

During the cycling operation of the resin as just described, it will be understood that the introduction of the rinse and pulse medium into the column is accommodated through the overflow means 26 above the upper reservoir. Some resin fines may be carried with the medium overflow and to permit recovery of the same a settling tank (not shown) can be provided.

Attrition of the resin during the operation is made up through supply of additional resin, as required from a reservoir (not shown) in communication with the upper reservoir.

In another embodiment of the invention which utilizes, essentially, the same apparatus and operational principles described above, there is introduced into the column 22 via line 56, controlled by valve 58 HCl as the stripping agent which is present in amounts of 50 percent in excess of the stoichiometric amount required. This alternative method increases the percent removal of sodium, potassium and calcium to about 90 percent of their original content in the crude untreated $H_3PO_4$ feed. Thus, it can be seen that the use of HCl provides certain advantages over the use of $H_2SO_4$ as the stripping agent. Not only is less stripping agent required but, additionally, greater amounts of certain contaminants are removed. The process according to this embodiment also produces a product which is less than about 5 percent diluted, the product being produced at a rate of about 14 tons per day.

As yet another embodiment of the invention, using again essentially the same apparatus and operational conditions as described above, the crude $H_3PO_4$ feed is, prior to introduction into the loading zone of the column 22 through line 32, diluted 5 to 10 times with water, i.e. a solution is prepared using from 5 to 10 parts $H_2O$ for each part of crude $H_3PO_4$ feed. The amount of $H_2SO_4$ introduced via line 56 as the stripping agent is reduced from 400 percent in excess of the stoichiometric amount required when an undiluted crude $H_3PO_4$ feed is employed to 300 percent. Comparable advantageous production rates are achieved in this modified version of the process described immediately above.

A further embodiment of the invention employs rather than $H_2SO_4$ HCl as the stripping agent when a dilute crude $H_3PO_4$ feed is introduced into the column. This expedient increases the removal of aluminum and iron from the less than 10 percent achieved using an undiluted $H_3PO_4$ feed to approximately 90 percent of their original content in the diluted feed stream. Further, the amount of HCl used is reduced to about 10 percent in excess of the stoichiometric amount required.

As a still further embodiment of the invention, employing the same general operational conditions and apparatus as set forth above, there is employed a crude $H_3PO_4$ feed which, prior to introduction into the loading zone of the column 22, is contacted with an elemental iron or $SO_2$ to reduce the iron contaminant present therein to the ferrous state. Thus, this embodiment of the invention provides for an increase in iron removal of greater than 75 percent of the original iron content in the crude feed as compared to the less than 10 percent removal obtained when the invention is practiced using a crude untreated $H_3PO_4$ feed as disclosed above. In the crude untreated $H_3PO_4$ about 90 percent of the iron is present in the ferric form and as such readily complexes with the phosphate thus substantially preventing its removal from the system. Additionally, this pretreatment permits the concentration of the stripping agent, i.e. $H_2SO_4$ to be substantially reduced to about 100 to 150 percent in excess of the stoichiometric amount required. Typically, 11 tons of product per day were recovered with less than 2 percent $P_2O_5$ loss experienced.

Another embodiment of the invention, conducted in essentially the same apparatus and involving substantially the same operational procedures as described above, involves pretreating the $H_3PO_4$ feed prior to introduction into the column with sodium carbonate to effect substantial elimination of the silica and fluoride contaminants from the feed stream. This pretreatment is in addition to the pretreatment described above which was conducted to substantially reduce the iron contaminant in the feed to the ferrous state. Thus, according to this embodiment of the invention, in addition to experiencing the advantageous elimination of iron, using $H_2SO_4$ as the stripping agent, nearly 60 percent of aluminum as well as 70 percent each of fluoride and silica contaminants were removed. The amount of the $H_2SO_4$ stripping agent employed was between 100 and 150 percent in excess of the stoichiometric amount required. However, up to 20 percent dilution of the purified $H_3PO_4$ product was experienced.

A further embodiment of the instant invention employs HCl, rather than $H_2SO_4$, as the stripping agent, with a feed pretreatment to reduce the iron contaminant in the crude feed to the ferrous state. This process, using HCl in amounts of 50 percent in excess of the stoichiometric requirement, results in nearly a 90 percent removal of the original iron contaminant content. A production rate of approximately 11 tons per day per sq. ft. is also achieved in this embodiment of the process.

In a further embodiment of the invention which employs HCl as the stripping agent in amounts of 50 percent in excess of the stoichiometric amount required, the crude $H_3PO_4$ feed, prior to introduction into the column via line 32, is pretreated with sodium carbonate to effect substantial elimination of the silica and fluoride contaminant from the fed stream. As discussed above, this pretreatment is in addition to the pretreatment which was conducted to substantially reduce the iron contaminant in the feed. When practicing this embodiment of the invention, approximately 70 percent of the original aluminum contaminant in the feed is removed. About 90 percent of the iron, calcium, potassium and sodium contaminants are also removed as well as approximately 70 percent each of the fluoride and silica contaminants.

Again, however, dilution of the purified feed product up to about 20 percent are experienced.

Referring now to FIGURE 2, the column 22 is essentially that disclosed in FIGURE 1 and further includes pipe 78 controlled by valve 80 to permit introduction of $H_2SO_4$ into the column as well as pipe 82 controlled by valve 84 to permit withdrawal of alkali metal sulfate formed in the column loop. Additionally, slip waste line 85 is provided immediately subjacent the conductivity probe 66. Between slip waste line 85 and brine solution inlet 56 there is provided rinse line 87 while between line 82 and line 85 there is positioned resin valve 89. The $H_2SO_4$ delivered from pipe 78 passes downwardly through the strong acid cation exchange resin which is loaded with sodium or potassium cations and from which is exchanged the sodium or potassium ion thereof for the hydrogen ion of the sulfuric acid with either sodium sulfate or potassium sulfate passing out of the section through pipe 82 controlled by valve 84.

As shown the continuous ion exchange column 22 is provided with pipe 56 controlled by valve 58 through which a brine solution comprising either sodium chloride or potassium chloride is admitted to the loading section 72 through distributing means 34. The loading section 72 thus located between resin valves 10 and 12 is provided to exchange, initially, the hydrogen ion of the incoming sulfuric acid solution for the sodium or potassium ion of the ion exchange resin. During the initial loading operation sulfuric acid as stated is delivered through pipe 78 controlled by valve 80 into the loading section 72 of the column at a point somewhat removed from and below resin valve 12. The sulfuric acid solution flows downwardly through the loading section with sodium or potassium sulfate leaving the column through line 82. While this operation is being performed, valve 89 is closed and valve 58 of pipe 56 to introduce either the sodium chloride or potassium chloride solution. The point of introduction of this brine solution is also somewhat removed from and below resin valve 12. The sodium chloride or potassium chloride solution also flows downwardly through the loading section 72 exchanging its sodium or potassium ion for the contaminating ion which is loaded on the resin after contact with the crude $H_3PO_4$ solution introduced into the column via pipe 32.

The flow of crude $H_3PO_4$ into the stripping section is upward or countercurrent to the downwardly flowing cation exchange resin loaded with hydrogen ions. On contact, the contaminating ions of the crude $H_3PO_4$ feed are loaded on the resin and purified $H_3PO_4$ is produced and withdrawn from the system via purified $H_3PO_4$ outlet conduit 60, controlled by valve 20, which is located adjacent the upper end of stripping section and below the conductivity probe 62.

As described hereinbefore, automatic control of the operation of the various valves is accomplished by conductivity probes 62, 64 and 66 to prevent adulteration of the various solutions in the column.

Referring now to FIGURE 3, this embodiment of the invention illustrates an ion exclusion process wherein crude untreated $H_3PO_4$ is delivered to the column through valve 30 via pipe 32 and passes upwardly through a strong acid type cation exchange resin which, preferably, completely fills the stripping section. Essentially, the $H_3PO_4$ molecule is absorbed on the resin with waste water and contaminants introduced with the crude $H_3PO_4$ feed passing out of the column through line 38 controlled by valve 40. The stripping section is also provided with pipe 56 controlled by valve 58 through which water is admitted to the stripping section. The entering water thus liberates the $H_2PO_4$ molecule absorbed on the ion exchange material and the resulting purified $H_3PO_4$ leaves the column through pipe 60 controlled by valve 20. This method provides for removal of 80 percent of the sodium, potassium, calcium and sulfate contaminants originally present in the untreated crude $H_3PO_4$ feed with about 20 percent removal of aluminum and up to 10 percent removal of iron contaminants.

As a modification of the ion exclusion process described immediately above with reference to FIGURE 3, there is employed a crude $H_3PO_4$ feed which, prior to introduction into the column 22, is contacted with elemental iron or $SO_2$ or any other convenient reducing agent to reduce the iron contaminant present therein to the ferrous state. Thus, this embodiment of the invention provides for an increase in iron removal of approximately 70 percent of the original iron content in the crude feed as compared to the approximate 20 percent removal obtained when the invention is practiced using a crude untreated $H_3PO_4$ feed.

As yet another modification of the ion exclusion process described with reference to FIGURE 3, there is employed a further pretreatment operation of the $H_3PO_4$ feed prior to introduction into the column with a sodium salt such as sodium carbonate, sodium sulfate, sodium chloride or the like to effect a substantial elimination of the silica and fluoride contaminants present in the feed stream. This pretreatment is in addition to the treatment, described above, which was conducted to substantially reduce the iron contaminant in the feed. Thus, according to this embodiment of the invention, in addition to experiencing the advantageous elimination of iron nearly 50 percent of aluminum as well as 70 percent each of fluoride and silica were removed. Again, a production rate of 7 tons per day of product were achieved in this embodiment of the invention.

Referring now to FIGURE 4, lime enters the ion exchange column 22 through valve 86 via pipe 88 and distributing means 90. Distributing means 90 is located at the upper end of loading section 72 of the column 22. The lime delivered from distributor 90 into section 72 passes downward through an ion exchange resin provided with, preferably, chloride ions which completely fills section 72 from which is exchanged the chloride ion thereof for the hydroxide ion of the lime, with $CaCl_2$, passing out the section through collecting means 92 and pipe 94 provided with valve 96. The column is essentially the same as that described with reference to the other embodiments and figures and is provided with a slip waste line 85, and rinse line 87 between the conductivity probe 66 and the potassium chloride inlet line 32. Additionally, resin valve 89 is provided between the slip waste line 85 and the rinse line 87.

The loading section 72 is provided with pipe 32 controlled by valve 30 through which KCl is admitted thereto via distributing means 34. During the loading operation the lime is delivered through pipe 88 into the loading section at a point somewhat removed from and below resin valve 12. The lime solution flows downwardly through the loading section and contacts the resin loaded with a chloride ion and exchanges its hydroxide ion for the chloride ion on the resin. Thus, calcium chloride is removed from the column via pipe 94 controlled by valve 96. While this operation is being performed with resin valve 89 being closed, potassium chloride is introduced into the loading section at a point also somewhat removed from and below resin valve 12 through pipe 32 controlled by valve 30. The potassium chloride solution flows downwardly through the loading section 72 and the chloride ion neutralizes the acid sulfate ion present on the anion exchange resin. Thus, di-potassium acid phosphate is removed from the system through collecting means 36 of pipe 38 which is controlled by valve 40. The stripping section is provided with pipe 56 controlled by valve 58 for introducing purified $H_3PO_4$ into this section. The flow of $H_3PO_4$ is upwardly or countercurrent to the anion exchange resin loaded with hydroxyl ions. On contact, the hydroxyl ion is neutralized with the hydrogen ion of the purified $H_3PO_4$ stream and water is conducted from the system via pipe 60 which is controlled by valve 20.

The resin movement as well as the control of the operation of the various valves is accomplished in essentially the same manner as described earlier with reference to FIGURE 1.

The embodiment of the instant invention illustrated in FIGURE 5 is essentially the same as that shown in FIGURE 4, above, with the exception that sodium chloride is introduced into the column 22 via pipe 32 controlled by valve 30 rather than potassium chloride. Thus, $Na_2HPO_4$ is removed from pipe 38 controlled by valve 40. As with the operation of the column described in FIGURE 4, the operational conditions and control thereof in the column shown in FIGURE 5 are also performed in the manner described with reference to the operation of the column shown in FIGURE 1.

FIGURE 6 represents an embodiment of the instant invention for producing potassium sulfate from calcium sulfate and KCl. The KCl is introduced into the column, substantially as described before, through distributor 34 in communication with pipe 32 controlled by valve 30. The column which is filled with strong acid cation exchange resin is loaded with calcium ions provided by contact of the resin with the calcium sulfate introduced into the column through pipe 56 controlled by valve 58. The downwardly flowing potassium chloride solution contacts the calcium loaded resin and exchanges the potassium ion for the calcium ion, calcium chloride being removed via pipe 38 controlled by valve 40. The potassium loaded resin ultimately flows downwardly and countercurrently to the upwardly flowing calcium sulfate in the stripping section of the column. A mixture of potassium sulfate and calcium sulfate are removed from the column via pipe 60 which is controlled by valve 20. Conveniently, pipe 60 is in communication with a means for separating the potassium sulfate from the calcium sulfate. This means can comprise any conventional separating means such as a centrifugal filter or the like 100. After the separation of the substantially insoluble calcium sulfate from the mixed product stream, the calcium sulfate can conveniently be returned via pipe 56 to the column 22. A production rate of about 5 tons per day per sq. ft. can be achieved with less than 1 percent loss of potassium.

FIGURE 7 illustrates a process for producing 2 M $K_2CO_3$ from a pressurized carbon dioxide and potassium chloride, 4 M KCl is introduced into column 2 which is filled with a strong base anion exchange resin. The downwardly flowing potassium chloride contacts the resin which is loaded with carbonate ions and exchanges its chloride ion for these ions. As a result 2 M potassium carbonate is withdrawn from collecting means 36 in communication with pipe 38 which is controlled by valve 40. The chloride loaded resin ultimately flows downwardly in the stripping section for countercurrent contact with the upwardly flowing pressurized carbon dioxide introduced to the column 22 via pipe 56 which is controlled by valve 58. The chloride ion of the result is exchanged for the carbonate ion and is removed together with excess carbonate via pipe 60 which is controlled by valve 20. The excess carbonate is thereafter separated from the HCl and returned via pipe 56 to the ion exchange column 22.

Referring now to FIGURE 8, which illustrates a system for producing a more efficient HCl stripping agent from a brine solution such as KCl or NaCl together with $H_2SO_4$. The brine solution is introduced into the column, substantially as described before, through distributor 34 in communication with the pipe 32 which is controlled by valve 30. The column is filled with a strong acid cation exchange resin and the downwardly flowing KCl brine solution contacts the hydrogen loaded resin and exchanges for the hydrogen ion the chloride ion thereof. HCl is withdrawn from the column through collecting means 36 which is in communication with pipe 38, controlled by valve 40. Preferably, the incoming brine solution comprises 4 M KCl or NaCl and, in accordance with the process of this embodiment, HCl of comparable strength is thus produced. The sodium or potassium loaded resin ultimately flows downwardly and countercurrently to the upwardly flowing sulfuric acid which is fed to the column through pipe 56 which is controlled by valve 58. During this countercurrent contact, the sodium and potassium ions are liberated from the resin in exchange for the hydrogen ion of the sulfuric acid, thus producing $Na_2SO_4$ or $K_2SO_4$ together with approximately 25 percent excess $H_2SO_4$. As can be seen, the operation of the resin valves as well as the resin movement through the column and the control of the various rinse valves and feed lines are essentially the same as that described in the discussion of FIGURE 1 as well as certain of the other figures hereinbefore described.

FIGURE 9 illustrates another embodiment of the instant invention which conveniently produces potassium nitrate from a KCl brine solution and nitric acid. The KCl brine enters the ion exchange column 22 through valve 30 via pipe 32 and distributing means 34. The KCl brine delivered from distributor 34 passes downwardly to strong acid cation exchange resin which completely fills the loading section and on which is absorbed the potassium value thereof. HCl passes out of this section through collecting means 36 and pipe 38 provided with valve 40. As before, this continuous cation exchange column is adapted for the intermittent circulation of the cation exchange resin from and to the loading section.

In the stripping section, $HNO_3$ is introduced into the column through pipe 56 controlled by valve 58. The flow of the nitric acid stripping agent is upward or countercurrent to the downwardly flowing potassium ion loaded resin. On contact, the potassium ions are liberated from the resin in exchange for the hydrogen ion of the nitric acid. Thus, potassium nitrate is produced and is withdrawn from the column through $KNO_3$ outlet conduit 60 controlled by valve 20 which is located adjacent the upper end of the stripping agent and below the conductivity probe 62.

As described with reference to FIGURE 1, the apparatus employed in the practice of the invention shown in FIGURE 9 is also provided with means for substantial automatic control of the operation of the various valves. The method of moving the resin about the column is also essentially the same as described hereinbefore. Conveniently, a production rate of 5 tons of 4 N $KNO_3$ per sq. ft. can be produced with less than 1 percent loss of potassium values.

FIGURE 10 illustrates yet another embodiment of the instant invention for the separation of sodium and potassium ions present in a mixed brine solution. The apparatus and method of moving the resin about the column is essentially that described hereinbefore. Thus, the brine solution which can comprise a mixture of KCl and NaCl is introduced into the column through distributor means 34 which leads from pipe 32 controlled by valve 30. The downwardly flowing brine solution contacts the upwardly flowing strong acid cation exchange resin and the potassium ions of the brine solution are exchanged for the hydrogen ions present on the resin. In order to preferentially load the potassium ions on the resin, inasmuch as the selectivity of the resin for potassium rather than sodium is quite small during the introduction of the mixed brine solution into the column, there is also introduced potassium chloride via a pipe 35 in amounts sufficient that the potassium ions preferentially load on the countercurrently flowing resin. Sodium chloride is thus removed from the system via the collecting means 36, and pipe 38 which is controlled by valve 40. Ultimately, the potassium ion loaded resin flows downwardly and countercurrently to the upwardly flowing nitric acid which is introduced into the column via pipe 56 controlled by valve 58. On contact, the potassium ions are liberated from the resin in exchange for the hydrogen ion of the nitric acid, thus producing $KNO_3$ which is removed from the column through pipe 60 which is controlled by valve 20. The potassium nitrate thus produced, advantageously, can be employed as a fertilizer product. The column is operated essentially in the same manner as described with reference to FIGURE 1.

FIGURE 11 illustrates another embodiment of the invention for the production of purified $H_3PO_4$ utilizing commercially produced $H_2SO_4$. This method is particularly advantageous in that, because of the plentiful supply of $H_2SO_4$, an excess can be introduced into the column such that the cations loaded on the strong acid cation resin can be substantially completely stripped therefrom. These contaminants together with the $H_2SO_4$ can be led from the column to an adjacent reaction zone wherein a crude source of phosphate, i.e., phosphate rock, is acidulated. The acidulation reaction provides crude phosphoric acid and an insoluble precipitate which can conveniently be separated from the crude acid by conventional means such as a filter. The insoluble precipitate contains contaminating ions. The separated crude phosphoric acid can be introduced into the column through pipe 56, controlled by valve 58 for upward and countercurrent contact with the downwardly flowing hydrogen loaded resin. Residual contaminating ions are then exchanged for the hydrogen ion of the resin and purified $H_3PO_4$ is removed from the column via product line 60 controlled by valve 20.

The resin loaded with the contaminating ion then subsequently flows upwardly in countercurrent contact with the downwardly flowing $H_2SO_4$, which is provided in amounts of 5 to 10 percent in excess of the stoichiometric amount required to liberate the contaminating ions from the strong acid cation exchange resin. The hydrogen ion of the sulfuric acid is then loaded onto the resin and ultimately flows downwardly and countercurrently to the upwardly flowing crude $H_3PO_4$ feed as described hereinbefore. Because of the available amount of excess $H_2SO_4$ introduced into the column, the contaminating ions are substantially completely removed from the resin and together with $H_2SO_4$ is withdrawn from the column via pipe 38 which is controlled by valve 40. This stream is then fed to the acidulation reactor 104 and together with the phosphate rock introduced therein crude $H_3PO_4$ is produced as described.

FIGURE 12 also illustrates an embodiment of the invention for the production of purified $H_3PO_4$ which can conveniently be practiced utilizing commercially produced $H_2SO_4$. Additionally, this embodiment employs NaCl as a stripping agent and the $Na_2SO_4$ and $H_2SO_4$ by-products can be led from the column and admixed with commercial $H_2SO_4$, generally about 93% $H_2SO_4$, to product a mixture containing about 55% $H_2SO_4$. This latter solution can be introduced to an adjacent reaction zone wherein a crude source of phosphate, i.e., phosphate rock, is acidulated. The acidulation reaction provides crude phosphoric acid and an insoluble precipitate which can conveniently be separated from the crude acid by conventional means, such as a filter. The insoluble precipitate contains contaminating materials, including fluorine and silica which are removed from the crude acid due to the complexing action of the sodium introduced with the acidulating medium. The relatively fluorine and silica free crude phosphoric acid can be introduced into the column through pipe 56, controlled by valve 58 for upward and countercurrent contact with the hydrogen loaded resin.

Conveniently, $H_2SO_4$ enters the ion exchange column through valve 86 via pipe 88 and distributing means 90. Distributing means 90 is located at the upper end of loading section 72 of the column 22. The $H_2SO_4$ delivered from distributor 90 into section 72 passes downwardly through a cation exchange resin loaded with sodium ions and for which is exchanged the hydrogen ion of the acid. An aqueous mixture of sodium sulfate and sulfuric acid passes out of the section through collecting means 92 and pipe 94 provided with valve 96. The column is also provided with slip waste line 85, and rinse line 87 between the conductivity probe 66 and the sodium chloride inlet line 30. Additionally, resin valve 89 is provided between the slip waste line 85 and the rinse line 87.

The loading section 72 is provided with pipe 32 controlled by valve 30 through which NaCl is admitted thereto via distributing means 34. During the loading operation $H_2SO_4$ is delivered through pipe 88 into the loading section at a point somewhat removed from and below resin valve 12. The acid solution flows downwardly through the loading section and contacts the resin loaded with sodium ions and exchanges its hydrogen ions for the sodium ions. Thus, an aqueous mixture of sodium sulfate and $H_2SO_4$ are removed from the column via pipe 94 controlled by valve 96. While this operation is being performed with resin valve 89 being closed, sodium chloride is introduced into the loading section at a point also somewhat removed from and below resin valve 12 through pipe 32 controlled by valve 30. The sodium chloride solution flows downwardly through the loading section 72 and exchanges its sodium ion for the metal contaminating ion present on the cation exchange resin. Thus contaminating metal chloride is removed from the system through collecting means 36 of pipe 38 which is controlled by valve 40. The stripping section is provided with pipe 56 controlled by valve 58 for introducing crude phosphoric acid into this section. The flow of the crude acid is upwardly or countercurrent to the cation exchange resin loaded with hydrogen ions. On contact the contaminating ions in the crude acid are exchanged for the hydrogen ions on the resin and purified $H_3PO_4$ is conducted from the system via pipe 60 controlled by valve 20. The resin movement as well as the control of the operation of the various resin valves, water rinse valves and slip waste lines is accomplished essentially as described hereinbefore.

The aqueous solution of sodium sulfate and sulfuric acid removed via pipe 94 is admixed with a supply of commercial grade $H_2SO_4$ (generally 93% $H_2SO_4$) thereby diluting the $H_2SO_4$ concentration to about 55%. This resulting mixture is then fed to the acidulation reactor 104 and together with phosphate rock introduced therein crude relative fluorine and silica free phosphoric acid is produced as described.

Discussion of specific embodiments of the invention

Preferably, the diameter of the column employed with the instant invention can be about 6 feet although it will be realized that columns having larger or smaller diameters can be used. The choice of a given diameter will depend, for instance, on production requirements and is easily determined by those skilled in the art. The length of the section between the crude mineral solution inlet and the by-product outlet of the loading section is about 10 feet although again this can be varied. The stripping section is also about 10 feet long between the stripping agent inlet and the product outlet. The washing section between water inlet 46 and the conductivity probe 66 is about 3 feet long, the conduit washing section between water inlet 50 and conductivity probe 62 is about 3 feet long while the section between the water outlet 54 and the product outlet is about 6 feet long.

Preferably, the strong acid cation exchange resin employed is Dowex 50, ×8 of between 16–100 mesh, preferably, 20–50 mesh. The anion exchange resin employed can be, preferably, a weak base anion exchange resin such as Amberlite IRA68 having a mesh size substatially the same as the cation exchange resin. Further, a strong base anion exchange resin having the physical characteristics described above, can be employed in the production of $K_2CO_3$ from pressurized carbon dioxide and potassium chloride.

The column and reactants introduced thereto can be maintained at a temperature ranging from about 50–100° C. although higher temperatures can be employed if desired.

As can be seen, this invention is preferably operated when the flow of the crude mineral solution into the loading section of the loop and the stripping operation are both conducted for predetermined periods of time. The shifting of the resin from one section to another is also carried out for a predetermined period of time generally in pulses lasting from about 10 to 20 seconds, said pulses being actuated, for instance, about every two minutes. Of course it will be recognized that these conditions can vary widely, depending upon a number of factors easily determined by the operator, such as the final product desired, the composition of the feed, the particular ion exchange resin employed and the physical dimensions of the column loop itself.

The column also, preferably, is constructed of mild steel having a suitable corrosion resistant liner fabricated of, for instance, rubber or plastic to avoid undue corrosion of the apparatus.

It will be understood from the foregoing description that this invention is not limited to practice according to the specific embodiments illustrated and described herein, and that variations thereof can be made without departing from the principles involved. This invention is, therefore, to be understood to be limited only by the spirit and scope of the following claims.

What is claimed is:

1. A continuous process for treatment of a crude phosphoric acid solution containing metal contaminants consisting essentially of:
   (1) flowing said crude phosphoric acid solution through a first section of an ion exchange column loop having a shiftable cation exchange resin bed therein, to bring the same into contact with a first portion of the cation exchange resin therein and exchanging metal ions from the crude phosphoric acid solution for hydrogen ions of the exchange resin, while
   (2) treating a second portion of said cation exchange resin loaded with said metal ions eliminated from the crude phosphoric acid solution from (1) with an inorganic acid stripping agent in a second section of said column loop;
   (3) exchanging the metal ions eliminated from the crude phosphoric acid solution and deposited on the exchange resin for hydrogen ions of the inorganic acid stripping agent and withdrawing purified phosphoric acid;
   (4) interrupting the flow of said crude phosphoric acid solution and said inorganic acid stripping agent;
   (5) shifting the cation exchange resin bed in said ion exchange column loop from one section thereof to another contiguous section therein; thereby replacing at least a portion of said resin in said first section with another portion of said resin previously stripped in said second section and displacing a portion of resin carrying the metal ions previously eliminated from the crude phosphoric acid solution into said second section for stripping thereof;
   (6) and repeating the same cycle of steps (1)–(5) as long as desired.

2. The process of claim 1 which includes treating the crude phosphoric acid prior to step (1) above to reduce the iron contaminant therein to the ferrous state.

3. The process of claim 2 which includes treating the crude phosphoric acid prior to step (1) and subsequent to reducing the iron contaminant to the ferrous state to remove silica and fluoride contaminants.

4. The process of claim 3 wherein the crude phosphoric acid is admixed with a sodium salt to remove silica and fluoride contaminants.

5. The process of claim 1 wherein organic acid is selected from the group consisting of sulfuric acid, hydrochloric acid, and nitric acid.

6. The process of claim 1 which includes diluting crude phosphoric acid with water prior to step (1).

7. The process of claim 6 wherein 1 part of crude phosphoric acid is diluted with 10 parts of water.

8. The method of claim 2 wherein the said flow of crude phosphoric acid solution through said cation exchange column loop in step (1) and exchanging the metal ion of the resin for hydrogen ion in a second section of the loop in step (2) are both conducted during a first predetermined period of time and said shifting of said cation exchange resin bed in step (5) is carried out for a second predetermined period of time.

9. The method of claim 1 wherein the cation exchange resin has a mesh size ranging from 16–100 mesh.

10. The method of claim 9 wherein the resin has a mesh size ranging from 20–50 mesh.

11. The method of claim 9 wherein the resin has a mesh size ranging from 50–100 mesh.

12. The method of claim 9 wherein the resin is an 8% cross-linked sulfonated styrene-divinyl benzene resin.

13. The method of claim 1 wherein the crude phosphoric acid solution flowing in step (1) is at a temperature of 50 to 100° C.

References Cited

UNITED STATES PATENTS

| 3,044,851 | 7/1962 | Young | 23—165 |
| 3,374,055 | 3/1968 | Villalon | 23—165 |
| 2,955,918 | 10/1960 | Ruehrwein | 23—165 |
| 3,065,044 | 11/1962 | Blanco | 23—102 X |

OTHER REFERENCES

Higgins, Indust. and Engr. Chem. vol. 53, pp. 635–37, August 1961.

Freiling et al., Chem. Abstracts, vol. 53, p. 9892d, May 1959.

HERBERT T. CARTER, Primary Examiner

U.S. Cl. X.R.

23—38, 87, 50, 63, 102, 107, 121, 154; 210—24, 37, 38